(12) United States Patent
Yukawa et al.

(10) Patent No.: US 8,170,988 B2
(45) Date of Patent: May 1, 2012

(54) SYSTEM AND METHOD FOR SYNCHRONIZING DATABASES

(75) Inventors: Steven J. Yukawa, Seattle, WA (US); Rajit Jain, Seattle, WA (US); Tim W. Anstey, Seattle, WA (US)

(73) Assignee: The Boeing Company, Chicago, IL (US)

( * ) Notice: Subject to any disclaimer, the term of this patent is extended or adjusted under 35 U.S.C. 154(b) by 660 days.

(21) Appl. No.: 12/172,792

(22) Filed: Jul. 14, 2008

(65) Prior Publication Data

US 2009/0265393 A1    Oct. 22, 2009

Related U.S. Application Data

(63) Continuation-in-part of application No. 12/104,600, filed on Apr. 17, 2008.

(51) Int. Cl.
*G06F 7/00* (2006.01)
*G06F 17/00* (2006.01)

(52) U.S. Cl. ........................................... 707/622
(58) Field of Classification Search .................. 707/622
See application file for complete search history.

(56) References Cited

U.S. PATENT DOCUMENTS

| | | | |
|---|---|---|---|
| 2,575,757 A | 11/1951 | Derek | |
| 2,612,606 A | 9/1952 | Stephen | |
| 2,755,216 A | 9/1956 | Lemons | |
| 2,873,931 A | 2/1959 | Fleschmann | |
| 3,002,190 A | 9/1961 | Oleesky et al. | |
| 3,463,418 A | 8/1969 | Miksch | |
| 3,604,661 A | 9/1971 | Mayer, Jr. | |
| 4,189,120 A | 2/1980 | Wang | |
| 4,318,328 A | 3/1982 | Rona | |
| 4,365,574 A | 12/1982 | Norminton | |
| 4,458,936 A | 7/1984 | Mulholland | |
| 4,661,821 A | 4/1987 | Smith | |
| 4,867,394 A | 9/1989 | Patterson, Jr. | |
| 4,878,062 A | 10/1989 | Craven et al. | |
| 5,093,313 A | 3/1992 | Minovitch | |
| 5,209,434 A | 5/1993 | Lo Presti et al. | |
| 5,216,435 A | 6/1993 | Hirata et al. | |
| D344,489 S | 2/1994 | Webb | |
| 5,458,299 A | 10/1995 | Collins et al. | |

(Continued)

OTHER PUBLICATIONS

Lednicer, David "The Complete Guide to Airfoil Usage," Apr. 5, 2005, http://www.ae.uiuc.Edu/m-selig/ads/aircraft.html.

*Primary Examiner* — Cam Truong
*Assistant Examiner* — Michael Pham
(74) *Attorney, Agent, or Firm* — Harness, Dickey & Pierce, P.L.C.

(57) ABSTRACT

A method for synchronizing information shared by a subsystem on-board a mobile platform and a subsystem remote from the mobile platform. The method may involve designating one of the subsystems as a first system having a first database, and designating one of the subsystems as a second system having a second database. The first subsystem may be used to transmit a synchronization request to the second subsystem, with the synchronization request including a synchronization point to be used as a reference for future synchronization operations between the subsystems. The second subsystem may be used to receive the synchronization request and to check the second database for any records that have been created or modified since a previously performed synchronization operation. Information may then be transmitted back to the first subsystem that includes information concerning the new or modified records.

14 Claims, 6 Drawing Sheets

U.S. PATENT DOCUMENTS

| | | |
|---|---|---|
| 5,689,276 A | 11/1997 | Uematsu et al. |
| 5,692,709 A | 12/1997 | Mihora et al. |
| 5,805,111 A | 9/1998 | Brettner et al. |
| 5,986,611 A | 11/1999 | Harrison et al. |
| D432,073 S | 10/2000 | Coyle |
| 6,204,820 B1 | 3/2001 | Jensen, Jr. |
| 6,385,610 B1 * | 5/2002 | Deffler et al. ............ 1/1 |
| 6,570,540 B2 | 5/2003 | Desargant et al. |
| 6,608,596 B2 | 8/2003 | Bien et al. |
| 6,751,442 B1 | 6/2004 | Barrett |
| D497,586 S | 10/2004 | Ferguson |
| 6,814,474 B2 | 11/2004 | Groeller |
| 6,831,610 B2 | 12/2004 | Quagliaro |
| 6,844,856 B1 | 1/2005 | Wright |
| 6,856,295 B2 | 2/2005 | Desargant et al. |
| 6,992,640 B2 | 1/2006 | Usami et al. |
| 7,123,199 B2 | 10/2006 | Rotta |
| 2003/0052829 A1 | 3/2003 | Desargant et al. |
| 2003/0084074 A1 * | 5/2003 | Balogh et al. ............ 707/201 |
| 2003/0142024 A1 | 7/2003 | Carson |
| 2008/0046962 A1 * | 2/2008 | Yukawa et al. ............ 726/1 |
| 2008/0052517 A1 * | 2/2008 | Anstey et al. ............ 713/176 |
| 2008/0165807 A1 * | 7/2008 | Nilo et al. ............ 370/503 |
| 2008/0168183 A1 * | 7/2008 | Marcy et al. ............ 709/248 |
| 2008/0187007 A1 * | 8/2008 | Goyal et al. ............ 370/503 |
| 2008/0189440 A1 * | 8/2008 | Goyal et al. ............ 709/248 |
| 2010/0006646 A1 * | 1/2010 | Stiller ............ 235/383 |

* cited by examiner

SYSTEM AND METHOD FOR SYNCHRONIZING DATABASES

CROSS REFERENCE TO RELATED APPLICATIONS

The present application is a continuation-in-part of U.S. application Ser. No. 12/104,600 filed Apr. 17, 2008, the disclosure of which is hereby incorporated by reference into the present disclosure.

FIELD

The present disclosure relates to systems and methods involving the creation, distribution and presentation of information for mobile platforms, and more particularly to a system and method that is able to update a plurality of databases in a highly time and bandwidth efficient manner.

BACKGROUND

The statements in this section merely provide background information related to the present disclosure and may not constitute prior art.

In commercial aircraft applications, it is often necessary to collect, reconcile and update a wide variety of information, such as airworthiness data, weather data, fuel, flight plans, etc., stored in a plurality of peer-to-peer databases. This operation is known in the information technology industry as "synchronizing" the databases. When using mobile platforms, the synchronization operation often needs to be carried out in network environments that may have limited bandwidth and availability. Specifically, the on-board databases of an aircraft and the off-board databases are often required to retain common data for use by applications running on-board the aircraft and off-board at a remote location.

When synchronizing the various, and often numerous, databases, it has traditionally been necessary to compare the entire list of records in one database with an entire list of records in another database to determine which records are missing between the databases. This design configuration thus requires that each system compare records of its databases against the databases of every other system in the peer network in order to synchronize. This can be quite time consuming, data intensive (requiring movement of large amounts of data) and involve significant bandwidth on the network being utilized for this purpose. Typically for mobile platforms to stay synchronized with non mobile platforms, the mobile platform requires a constant and synchronous connection to the network that all systems are connected to.

SUMMARY

In one aspect the present disclosure is related to a method for synchronizing information shared by a subsystem on-board a mobile platform and a subsystem remote from the mobile platform. The method may comprise: designating one of the subsystems as a first subsystem having a first database; designating one of the subsystems as a second subsystem having a second database; using the first subsystem to transmit a synchronization request to the second subsystem, the synchronization request including a synchronization point to be used as a reference for future synchronization operations between the subsystems; using the second subsystem to receive the synchronization request and to check the second database for any records that have been created, modified or missing since a previously performed synchronization operation; and transmitting information back to the first subsystem that includes information concerning the new or modified records.

In another aspect a method is disclosed for synchronizing information shared by a subsystem within a mobile platform and a subsystem remote from the mobile platform. The method may comprise: designating one of the subsystems as a first subsystem having a first database; designating one of the subsystems as a second subsystem having a second database; using the first subsystem to generate and transmit a message payload list that includes a synchronization point and at least one record, with the one record including a unique identification code; using the second subsystem to receive the message payload list and to update the second database using the one record; and using the second subsystem to notify the first subsystem of all records stored in the database that have been created since a previously defined synchronization point between the first and second subsystems. In still another aspect a system is disclosed for synchronizing information shared between a mobile platform and a facility remote from the mobile platform. The system may comprise: a first subsystem located on-board the mobile platform and having a first database; a second subsystem located at the facility remote from the mobile platform, the second subsystem having a second database; the first subsystem being adapted to generate and transmit a synchronization request to the second subsystem, the synchronization request including a synchronization point to be used as a reference for future synchronization operations between the subsystems; and the second subsystem being adapted to receive the synchronization request and to check the second database for any records that have been created or modified since a previously performed synchronization operation, and to transmit information back to the first subsystem that includes information concerning the new or modified records.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
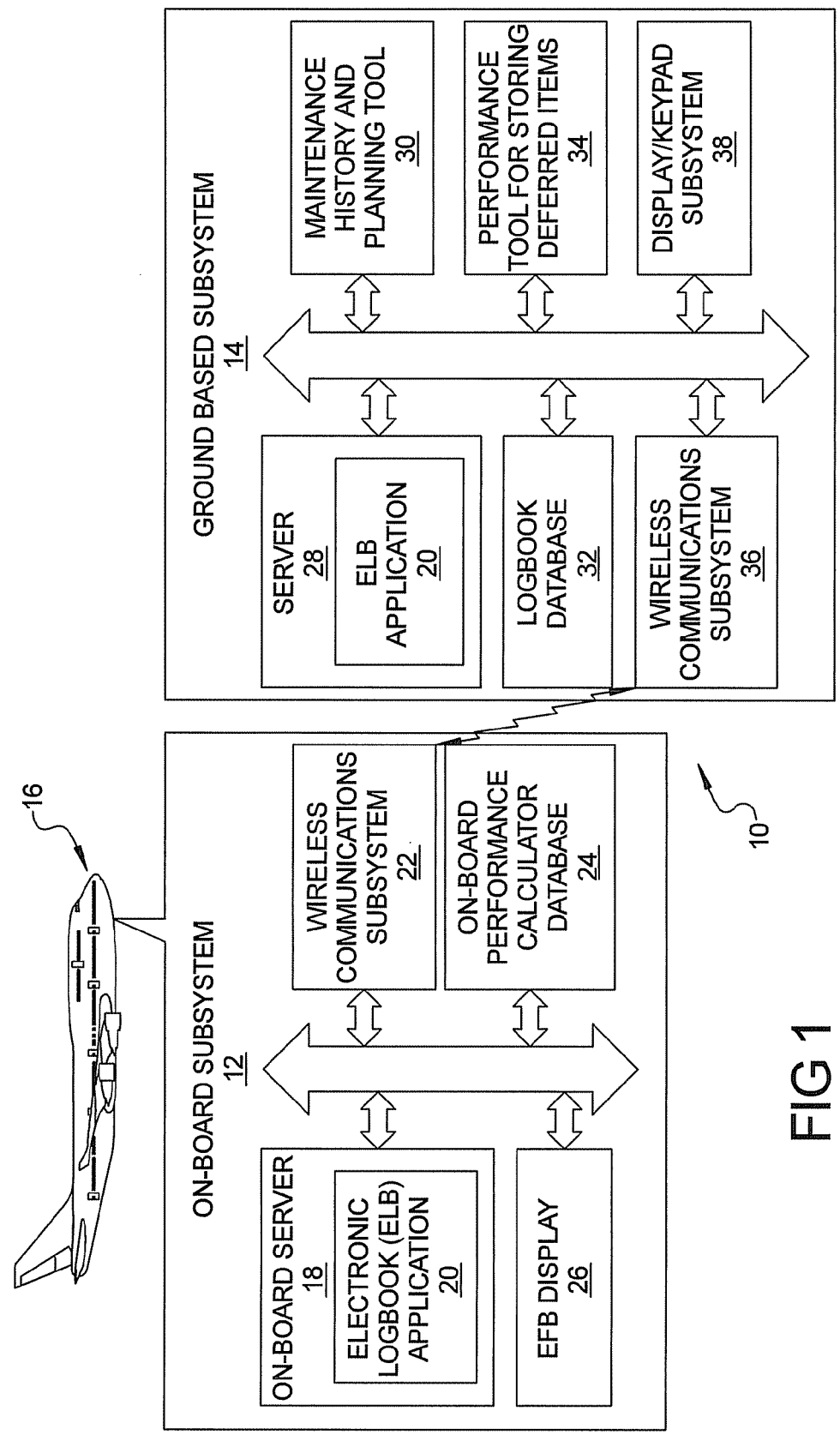
FIG. 1 is a block diagram of one embodiment of a system in accordance with the present disclosure.

Referring to FIG. 1, there is shown one embodiment of a system 10 in accordance with the present disclosure. The system 10 generally may include an on-board subsystem 12 carried on-board a mobile platform 16, and a remote, ground based subsystem 14. In this example, the mobile platform is shown as an aircraft, and will be referenced throughout the following discussion as "aircraft 16". However, it will be appreciated that the system 10 could just as readily be implemented with any other form of mobile platform such as a bus, train or other form of land vehicle, or a boat, ship or other form of a marine vessel. Essentially, the system 10 may be used with any mobile platform where it is desirable to perform predefined operational worthiness checks, or checks of any other types of data or information, before operating the mobile platform. Also, it will be appreciated that while the on-board system 12 is illustrated as being on the aircraft 16, that the system 12 could just as readily be located off-board the aircraft 16.

The on-board system 12 may be in wireless communication with a central subsystem, for example a ground based subsystem 14. Typically, when the system 10 is implemented in connection with a commercial aircraft, the ground based subsystem 14 will be operated by the airline that is operating the aircraft 16. The on-board subsystem 12 may include an on-board server 18 running an electronic logbook (ELB) software application 20. The on-board server 18 may be in communication with a wireless communications subsystem 22, an on-board performance calculator database 24 and a display system 26. The display 26 is illustrated as being the display of an Electronic Flight Bag (EFB), but the display 26 could just as readily be implemented as a stand-alone display. The EFB is disclosed in co-pending U.S. patent applications "Multi-Network Aircraft Communication Systems and Methods" (Communication Management), U.S. application Ser. No. 11/303,647, Filed 16 Dec. 2005; "Security Certificate Management", U.S. application Ser. No. 11/191,622, Filed 28 Jul. 2005; and "Automated Integration of Fault Reporting" (ELB Synchronization), application Ser. No. 11/191,645, Filed 28 Jul. 2005, all of which are owned by The Boeing Company, and all of which are hereby incorporated by reference into the present application.

The ground based subsystem 14 may include a server 28 that also runs the ELB application 20. The server 28 may be in communication with a maintenance history and planning tool 30. The maintenance history and planning tool 30 may be an airline's system to manage maintenance history records of an aircraft. The planning tool 30 may also assist airline operators in scheduling planned maintenance activities such as A-checks (routine checks and maintenance such as fluid changes) and D-checks (heavy checks that may last 2-3 months). The server 28 is also in communication with a logbook database 32 and a performance tool for storing deferred items 34. The logbook database 32 may contain an aircraft's records, including a record of flights performed, aircraft defects, maintenance actions taken to address the defects, aircraft servicing records and maintenance release records. The performance tool 34 may use a database (not shown) to indicate inoperative items (deferred defects) which have an impact on takeoff and/or landing performance calculations. A wireless communications subsystem 36 enables the ground based subsystem 14 to communicate with the onboard system 12 on the aircraft 16. The wireless communications subsystem 36 may be an electromagnetic wave transceiver having bidirectional communications capability. A display/keypad subsystem 38 forms a feature that enables an individual, for example a line release mechanic, to input maintenance or fault information to the system 10 (on-board or via the ground) or alternatively to view displayed airworthiness information during creation of the MR record. An LCD or CRT display, or any suitable display may be used for this purpose. Either a touchscreen or an independent keyboard/keypad may be utilized to enable an individual to input the maintenance and/or fault information to the system 10.

The ELB application 20 permits the performance calculator database 24 onboard the aircraft 16, the logbook database 32 and the maintenance history and planning tool 30 on the ground based system 14 all to be electronically accessed and pertinent airworthiness information entered in each subsystem be communicated with the other subsystems. This ensures that the most current (i.e., up-to-date) airworthiness information that needs to be considered when creating a maintenance release (MR) record is considered by the releasing line mechanic (or other individual) who is responsible for creating the MR record. Since no paper reports or paper-based logbooks are required by the system 10, the chance of the releasing line mechanic being provided with less than current information is substantially reduced or entirely eliminated. Since the onboard subsystem 12 and ground based subsystem 14 may be in continuous wireless communications, this means that the databases 24 and 32 on each subsystem 12 and 14, as well as the maintenance history and planning tool 30, may be updated essentially instantaneously whenever any of the foregoing subsystems receives new airworthiness information. Thus, each database 24 and 32, the maintenance history and planning tool 30 and any other subsystem containing airworthiness information will always have the most current and up-to-date airworthiness information available for review.

It will be appreciated that by "airworthiness" information, it is meant any information that may be important to understanding the maintenance items affecting the aircraft 16, the status of any open faults that may affect the aircraft, as well as any operating restrictions affecting flight or operation of the aircraft 16. Typically, airworthiness information may involve:
- performance restrictions (i.e. flight limited to particular altitude or below)
- Extended Operations/Long Range Operations (ETOPS/LROPS) restrictions (e.g., aircraft must fly within 120 minutes of a suitable landing airport);
- Autoland restrictions (i.e. Autoland restricted to CAT II operations only)
- all active deferrals (maintenance items not requiring immediate attention);
- all expired deferrals (maintenance items covered by a deferral whose predetermined time period has expired);
- all open maintenance items such as all technical faults and all non-technical faults (i.e., items needing further action before an MR record can be created);
- all recheck actions (active deferrals requiring a re-check before the MR record can be created);
- all closing maintenance actions (i.e. repairs made to address a technical or non technical fault, for example replacing a line replaceable unit (LRU));
- all servicing actions (e.g., adding engine oil, APU oil; required maintenance checks, that is ETOPS/LROPS, arrival and departure))

Figure 2:
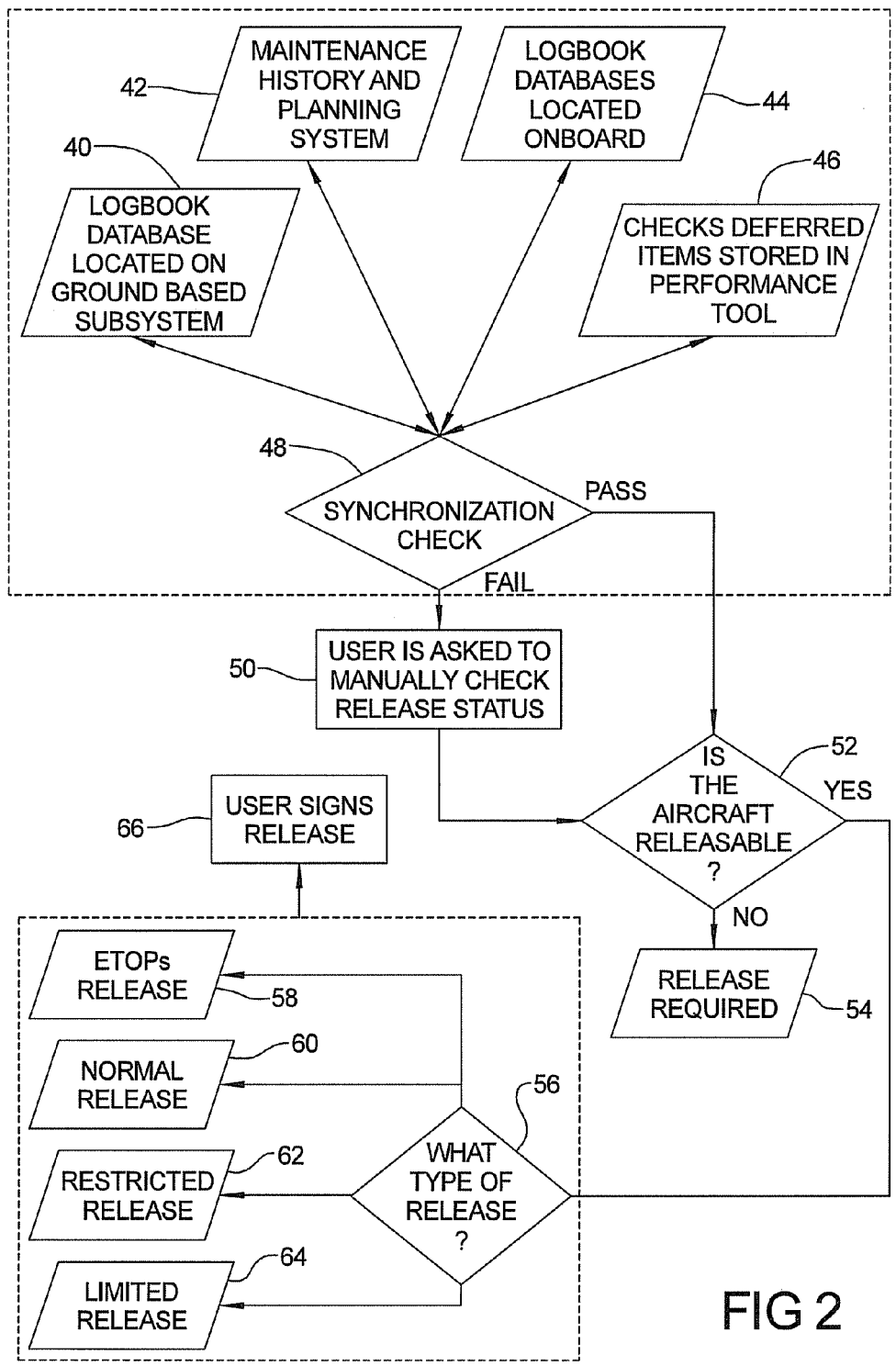
FIG. 2 is a flowchart of major operations performed by the logbook application of FIG. 1.

Referring to FIG. 2, a high level flow diagram is illustrated of major operations that the ELB application 20 of the system 10 may perform. Initially the logbook database 32 located on the ground based subsystem 14, the maintenance history and planning tool 30, the on-board performance calculator database 24 and the performance tool for storing deferred items 34 are all accessed at operations 40, 42, 44 and 46, respectively, and then checked during a synchronization check operation 48. The synchronization check operation 48 is used to verify that the most current airworthiness information has been obtained from each of the various subsystems 24, 30, 32 and 34. This ensures that the responsible airline employee reviewing the data has the most up-to-date information from each of the subsystems 24, 30, 32 and 34. The synchronization check operation may be implemented via a suitable software subroutine in the ELB application 20 that checks the available databases and other sources of information where airworthiness information is being obtained to make sure that the most up-to-date information is being supplied to the user. This check may also be performed at preset time intervals, for example every few minutes or every hour, to make sure that the most up-to-date information is being provided to the user. It will also be appreciated that the synchronization check feature is fully configurable by the airline that is operating the aircraft 16 to electronically check any number of available databases or subsystems where pertinent airworthiness information may be available and obtainable.

If the synchronization check operation 48 does not complete successfully, then a user is asked via a message to manually check the release status, as indicated at operation 50. This message may be presented via the display/keypad subsystem 38. This may involve the line mechanic at the aircraft contacting (e.g., calling) an operations control person to manually verify the logbook status. The ELB application 20 then makes an inquiry at operation 52 to see if the aircraft is releasable, meaning that a valid MR record can be created for it. The release rules are fully configurable by the airline and may include a rule for determining the existence of technical open faults; a rule for determining if servicing is required; a rule for determining if open non-technical items; and a rule for deciding if a Maintenance Release is valid for multiple flights. The rule for deciding if a Maintenance Release is valid for multiple flights may involve a rule that evaluates the past maintenance activity to determine if a past release is still valid. It may also evaluate the current Maintenance Release and determine if a time limit for the Maintenance Release has expired.

If the check at operation 52 produces a "No" answer, then a MR is still required, as indicated at operation 54. This message may also be provided via the display/keypad subsystem 38. The release rules used at operation 52 are also configurable by the airline. These release rules may involve one or more of: a rule for the existence of technical Open Faults; a rule for servicing required; a rule for open non-technical items; and/or a rule for the MR being valid for multiple flights or period of time. The rule for multiple flights may be a rule that evaluates the past maintenance activity to determine if a past MR is still valid. The rule for multiple flights may also evaluate the current MR and determine if a predetermined time limit (e.g. 24 hours, 72 hours) for the MR is still valid.

If the synchronization check operation 48 completes successfully, then operation 52 is performed to see if the aircraft is releasable. If so, then a check is made at operation 56 to determine the exact type of MR that exists for the aircraft 16. At operations 58, 60, 62 and 64, examples of different types of releases that may be displayed are: an "ETOPS/LROPS Release"; a "Normal Release"; a "Restricted Release" and a "Limited Release". The "Normal Release" is a standard type of release where the aircraft 16 is released with no operating restrictions or no open faults. The "Restricted Release" is where the aircraft is released with certain operating restrictions. A "Limited Release" is where the aircraft is released with open faults. An "ETOPS/LROPS" release is where the aircraft is released with authority to fly an ETOPS/LROPS mission as defined by airline procedures and approval from an applicable regulatory authority. At operation 66 the user may sign the MR.

Figure 3:
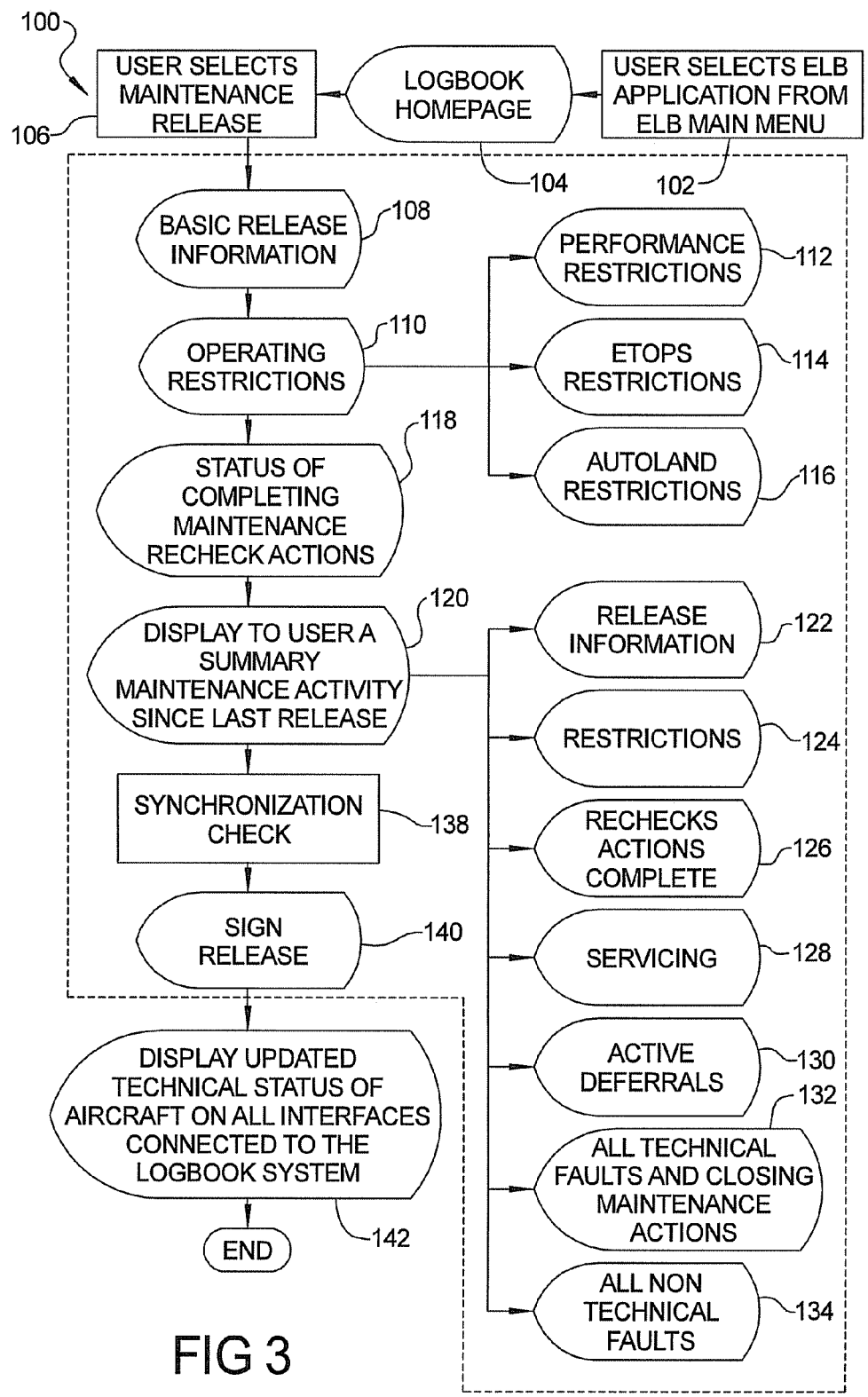
FIG. 3 is a more detailed flowchart of operations performed by the logbook application of FIG. 1.

Referring now to FIG. 3, a more detailed flowchart 100 of major operations that may be performed by the logbook application 20 of the system 10 is shown. At operation 102 the user may select the ELB application 20 from the EFB main menu displayed on the display/keypad subsystem 38, as indicated at operation 102. This brings up the ELB application home page on the display/keypad subsystem 38, as indicated at operation 104. The user may then select "Maintenance Release" at operation 106. A screen may then be brought up on the display/keypad subsystem 38 at operation 108 where the user can input various release information. Such release information may include a release station that the user is at, release comments, release data and any other basic release information that would be important for the ELB application 20 to have.

At operation 110, the ELB application 20 aggregates all operating restrictions for the aircraft 16 from active deferrals such as performance restrictions 112, ETOPS/LROPS restrictions 114 and Autoland restrictions 116. At operation 118, a status of the completion of maintenance recheck actions is displayed to the user. At operation 120, a summary of all maintenance data is presented to the user via the display/keypad subsystem 38. This maintenance data may involve all maintenance activity since the last MR was created, or all maintenance activity performed at the particular station at which the user is using the system 10. The summary of maintenance activity since the last MR may involve the display of the following information: a summary of release information including date/time and location of release at operation 122; operating restrictions on the aircraft at operation 124; whether maintenance recheck actions are complete at operation 126; servicing information for the aircraft 20 at operation 128; active deferrals for the aircraft 130; all technical faults and Closing Maintenance actions at operation 132; and all non-technical faults 134.

At operation 136 the synchronization check operation is performed to check all other databases or devices connected to or in communication with the server 28 of the ground based subsystem 14, for any synchronized data. At operation 138 the ELB application 20 sends the MR to all other subsystems or devices within the system 10 or outside the system that may be in communication with the system 10. At operation 140, an updated technical status of the aircraft 16 may be displayed on all interfaces in communication with the ELB application 20. This involves displaying the MR status on such subsystems as the display/keypad subsystem 38, the EFB display 26 and any display device where such information would be useful to view. It will also be appreciated that including non-technical faults in the MR record is configurable, as are creating a new MR for every flight and displaying the status of maintenance recheck actions at operation 118.

An important benefit of the ELB application 20 is that it is configurable to meet the needs and preferences of an airline, as far as what maintenance items, fault items and restrictions are to be checked and presented during the process of creating the MR record. For example, the ELB application 20 may be configured to require that a new MR record be created for every flight.

The system 10 thus enables the most up-to-date maintenance, fault and restriction information to be electronically acquired and presented to the user in an organized fashion. Virtually any number of databases or devices may be checked by the system and all pertinent airworthiness information obtained for consideration by a user charged with evaluating such information to create a MR record. The synchronization feature of the system 10 enables the various databases to be checked for the most up-to-date information when collecting airworthiness information for consideration by the user. This also facilitates real time (i.e., essentially instantaneous) updating of the various databases and devices that the system 10 is in communication with. The elimination of paper reports and paper-based logbooks virtually eliminates the possibility of outdated airworthiness information being considered by an individual charged with creating an MR record.

Figure 4:
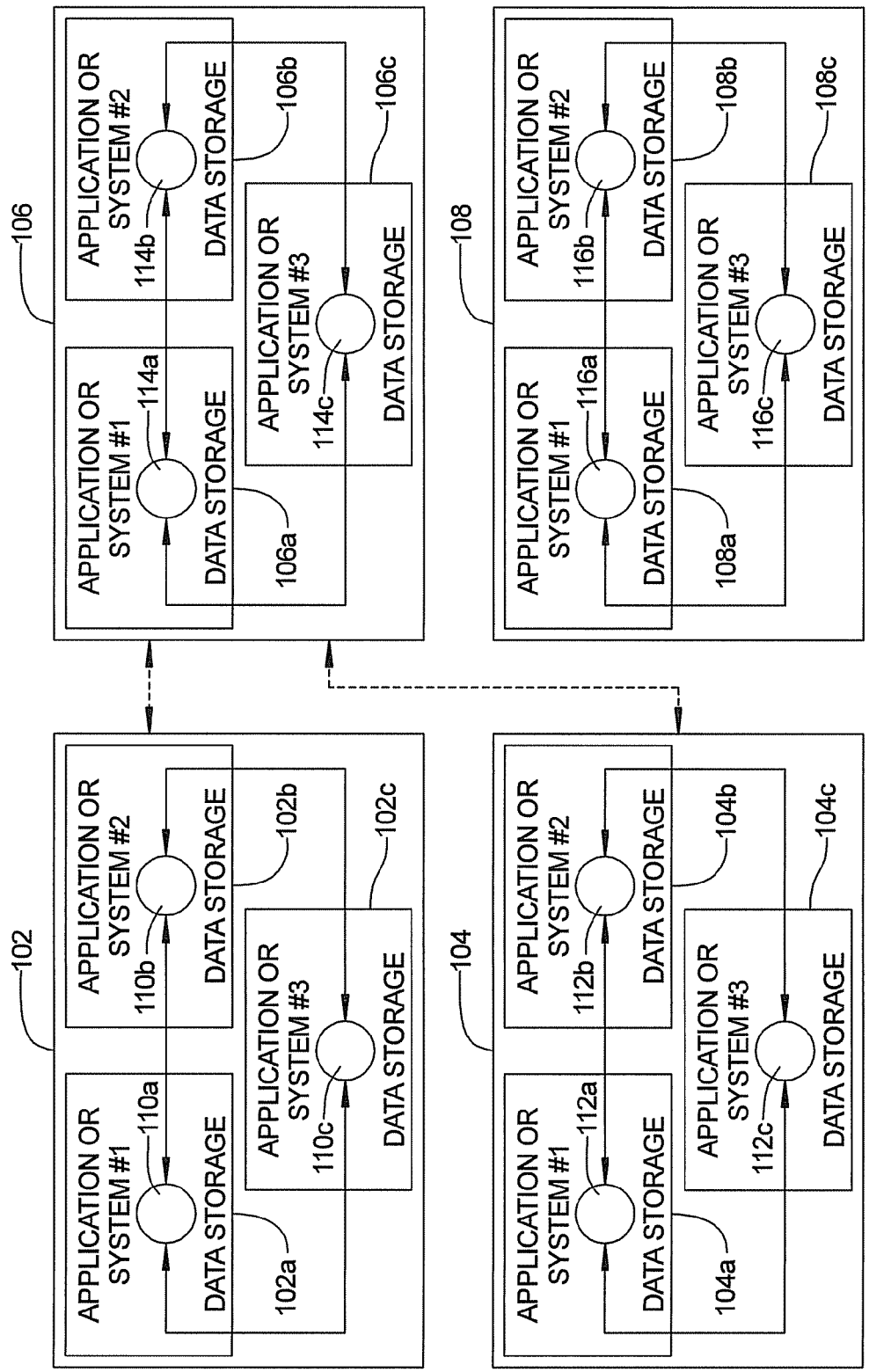
FIG. 4 is a block diagram of an embodiment of a system that implements a synchronization system and methodology for synchronizing databases of a plurality of subsystems.

Referring now to FIG. 4, a system 100 for synchronizing the databases of a plurality of independent subsystems is shown. In this example two mobile platforms 102 and 104 are illustrated along with two ground based facilities (or platforms) 106 and 108. However, it will be understood that the system 100 may be implemented with a lesser number or a greater number of mobile platforms, as well as a lesser number or greater number of ground based facilities. For example, the system 100 could be implemented to synchronize communications between the subsystems located at each of a plurality of ground based facilities (i.e., where no mobile platforms are involved). Also, while facilities 106 and 108 are shown as ground based facilities, it will be appreciated that these could also be mobile platforms.

The mobile platform 102 in this example carries three independent subsystems 102a, 102b and 102c. Mobile platform 104 similarly carries three independent subsystems 104a, 104b and 104c. The subsystems 102a, 102b and 102c each include an associated data source, which will be referred to for convenience as database 110a, 110b and 110c, respectively, while subsystems 104a, 104b and 104c each include a data source, which will also be referred to for convenience as database 112a, 112b and 112c, respectively.

Ground facility 106 includes independent subsystems 106a, 106b and 106c while ground facility 108 includes independent subsystems 108a, 108b and 108c. Subsystems 106a, 106b and 106c each include databases 114a, 114b and 114c, respectively, while subsystems 108a, 108b and 108c include databases 116a, 116b and 116c, respectively.

In this example each of the databases 110, 112, 114 and 116 will be storing information that is identical with that being stored by all of the other databases. Since each database may be updated independently of the others, it becomes highly desirable to ensure that the databases can be synchronized. By "synchronized" it is meant that the databases are checked and updated as necessary to ensure that each database contains the records present in every other database, and that each record in every database represents the most up to date information. This is accomplished by providing each subsystem 102a, 102b,102c, 104a,104b,104c, 106a,106b,106c and 108a, 108b,108c with the ability to initiate a synchronization operation before using any data stored in its database.

Figure 5:
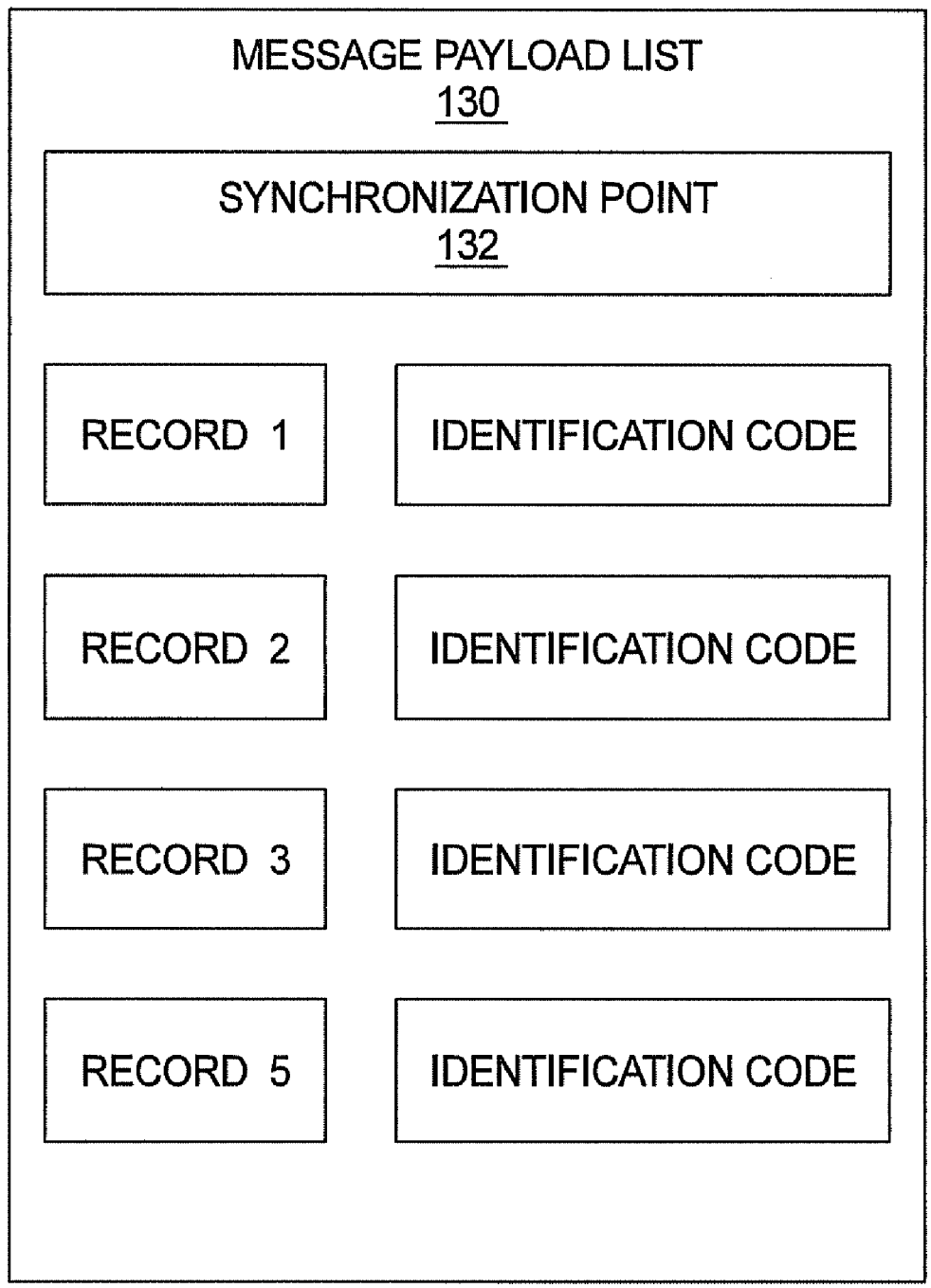
FIG. 5 is a diagram of a message payload list that may be transmitted by any one of the subsystems shown in FIG. 4.

With brief reference to FIG. 5, when any one of the subsystems 102a-102c, 104a-104c, 106a-106c or 108a-108d decide to initiate a synchronization operation it may create a message payload list 130. For example, consider that subsystem 102b is initiating the synchronization operation. The message payload list 130 created by subsystem 102b will also include a synchronization point 132 and a list of records stored in the database 110b of subsystem 102b that subsystem 102b knows have been modified since the last previously performed synchronization operation that it participated in. Each record will have assigned to it a unique identification number, which may be a unique identification code. In the aircraft industry it is required that when information within a record is modified that a copy of the record is created and a new identification number assigned to the copy. However, the original record will typically also be kept. Similarly, if a record has been added to the database 110b since the last performed synchronization, then the record along with its identification code may be included in the message payload list.

The synchronization point created by subsystem 102b that is included in the message payload list 130 defines a unique identifier such as time and date, that will be stored by all other subsystems participating in the synchronization operation. If a specific time is used to uniquely identify the synchronization point, it may be a time of day to the millisecond, or if less precision is required then the time may be merely to the hour or minute. Any synchronization point, however, may be used as log as it is unique.

In this simplified example the synchronization point will be stored by both subsystems 102b and 106a. This will serve as a reference point that the subsystems 102b and 106a will both In this simplified example the synchronization point will be stored by both subsystems 102b and 106a. This will serve as a reference point that the subsystems 102b and 106a will both reference the next time they are involved in a synchronization operation. Subsystem 106a will look at the identification codes presented in the message payload list 130 and will check its own database 114, from the time of the previously used synchronization point, which it will have stored, to make sure that its database includes records having the exact same identification codes. Thus, the subsystem 106b is not checking all of the identification codes stored in its database 114a, but only those identification codes in the database 114a that have been created since the reference synchronization point. For any identification code listed in the message payload list 130 that is not found by subsystem 106a in its database 114a when checking the collection of identification codes in its database that were created subsequent to the previous synchronization point, the subsystem 106a notifies the subsystem 102b in a subsequent communication that it needs the data associated with the record(s) that it did not find. The subsystem 102b then responds by transmitting the data associated with the noted record(s).

From the foregoing simplified example of communication between subsystems 102b and 106a, it will be appreciated that subsystem 102b does not send all the data associated with all the records in its database 110b to subsystem 106a for updating and/or verification. By sending the message payload list 130, which only includes the identification codes for records that have been newly created (or modified) since the last synchronization was performed (based on the previously synchronization point), a highly significant reduction in the amount of information exchanged between subsystems 102b and 106a can be achieved. Similarly, subsystem 106b does not need to check all of the identification codes stored in its database, but rather only those that were created subsequent to the previously defined synchronization point. Since the subsystems 102a-102c, 104a-104c, 106a-106c and 108a-108c will all often be communicating on a wireless network (which is typically bandwidth limited), this significantly reduces network traffic and significantly reduces the time required to update each database of the system 100. Previously developed systems have often required that all of the underlying data corresponding to every record stored in the database of a subsystem be transmitted to every other subsystem, with the other subsystems doing the same, so that all of the subsystems can be synchronized. As will be appreciated, this can involve the transmission of an inordinately large amount of data between the various subsystems and take significant time to complete. This can also be expensive to an airline, which may be charged by the kilobyte for data transfer. If such a data transfer must be carried out using an asynchronous communication protocol, then this can further significantly increase the time required to complete the synchronization.

Referring further to FIG. 4, when any one of the subsystems of any one of the mobile platforms 102 or 104, or either of the ground facilities 106 or 108, initiates a synchronization operation, the databases 110, 112, 114 and 116 of all of the other subsystems 102, 104, 106 and 108 will be queried and updated so that the end result is that all of the databases 110, 112, 114 and 116 will have their contents updated. By "updated" it is meant that records contained in each of the databases 110, 112, 114 and 116 will be modified so that each has stored therein the most up-to-date information for every like record. As a result, like records in different databases 110, 112, 114 and 116 will also be identical. In some applications, particularly commercial and military aircraft applications, this is highly useful for ensuring that data being considered by the flight crew, airline personnel and maintenance personnel is in fact the most up to date data available.

In a commercial or military aircraft application, the situation is often as presented in FIG. 4, that is, a plurality of aircraft each have a plurality of on-board subsystems that are storing airworthiness information or other forms of information such as fuel records, flight plans, weather, cabin-related items, etc. Each such on-board system needs to communicate with a plurality of off-board subsystems at different facilities. In this scenario, it is preferred (but not absolutely essential) that the on-board subsystems of any given aircraft 102 or 104 be synchronized with the aircraft's other subsystems. Thus, for example, it is preferred that subsystems 102a, 102b and 102c be synchronized with each other before any one of these subsystems initiates a synchronization with any of the subsystems 104a, 104b and 104c of aircraft 104, or with any of the subsystems of facility 106 or 108. In this example, the subsystems 102a, 102b and 102c are treated or identified as a domain of peer data sources, and any one of them can initiate a synchronization with the others. Similarly, the subsystems 104a, 104b and 104c are treated as a peer domain and may be synchronized with each other before any one of them initiates a synchronization with any of the subsystems on aircraft 102, facility 106 or facility 108. The same applies to the subsystems of facilities 106 and 108. Synchronizing all of the subsystems on a given aircraft 102,104 or facility 106,108 dramatically reduces the bandwidth requirements for performing a synchronization between the aircraft 102 and 104 and the facilities 106 and 108.

Figure 6:
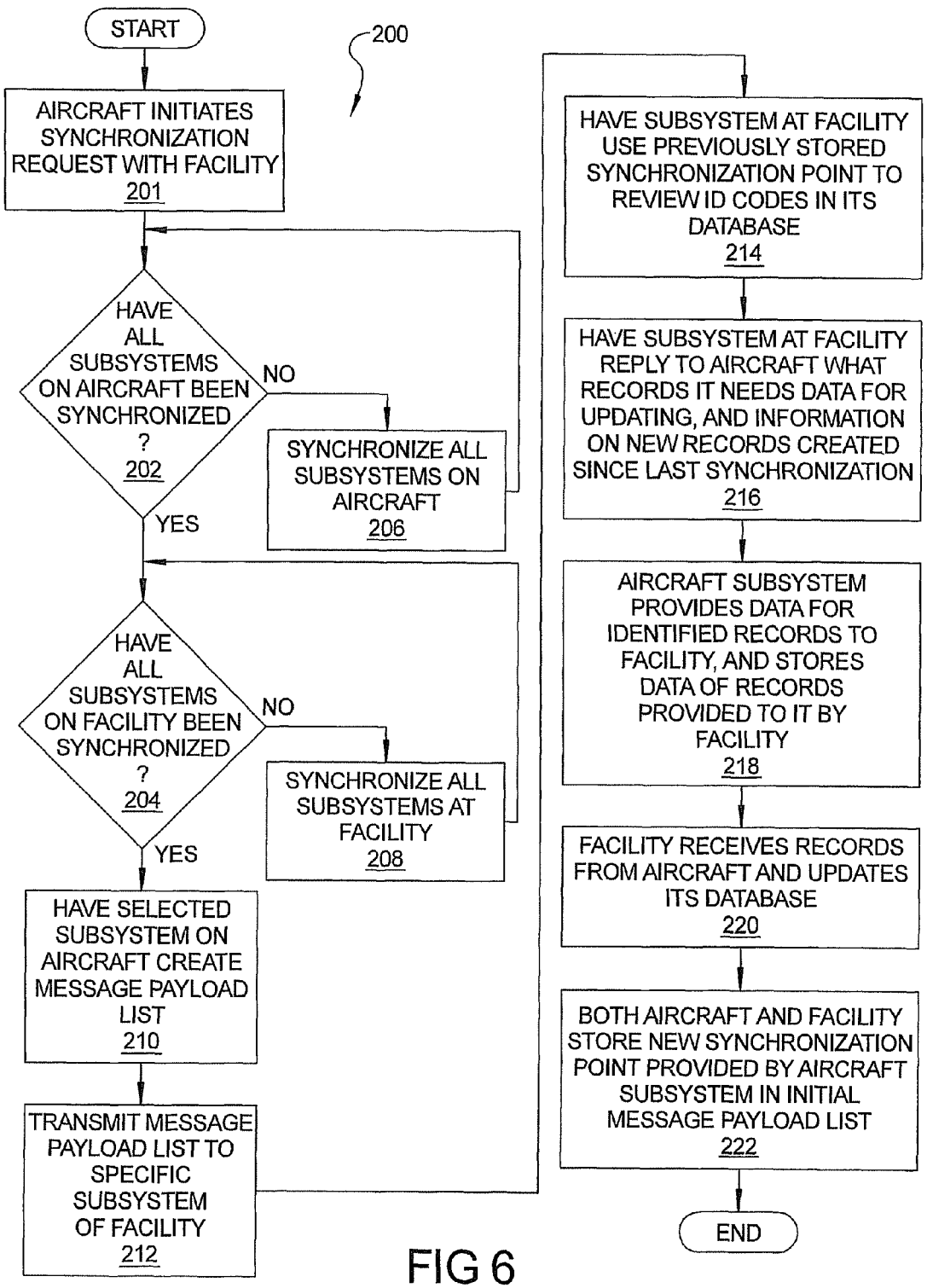
FIG. 6 is a flowchart of operations that may be performed between two subsystems during a synchronization operation.

Referring now to FIG. 6, a flowchart 200 is shown that will describe in even greater detail one exemplary synchronization operation between aircraft 102 and facility 106. As indicated at operation 202, the aircraft 102 initiates the synchronization operation by using any one of its subsystems 102a, 102b or 102c to send a synchronization request to a specific subsystem 106a, 106b or 106c at the facility 106. For this example it will be assumed that the request is sent from subsystem 102b and that subsystem 106a receives this request. At operation 202 a check is made if all the subsystems 102a, 102b and 102c on the aircraft 102 have been synchronized. If not, then a synchronization operation is performed on all of the subsystems of the aircraft 102, as indicated at operation 206, and operation 202 is repeated. When the inquiry at operation 202 provides a "Yes" answer, then a check is made at operation 204 to make sure all of the subsystems 106a, 106b and 106c of facility 106 have been synchronized. If this inquiry produces a "No" answer, then a synchronization is performed between the subsystems at the facility, as indicated at operation 208, and operation 204 is repeated. When the inquiry at operation 204 produces a "Yes" answer, then the subsystem 102b creates a list, for example a message payload list, with a new synchronization point, as indicated at operation 210. The new message payload list is then transmitted to the subsystem 106a at the facility 106, as indicated at operation 212.

At operation 214, the subsystem 106a uses the previously stored synchronization point to assist in reviewing the identification codes in its database 114a. Only records having identification codes that are not associated with a previous synchronization point are reviewed. The subsystem 106a matches records that it and subsystem 102b have, as well as identifies mismatches of records. By identifies "mismatches", it is meant identifying records that the receiving subsystem 106b has that the sending subsystem 102b does not have, or a record that the sending subsystem 102b has that the receiving subsystem 106a does not. At operation 216 the subsystem 106a replies to the aircraft subsystem 102b with a list of what identification codes it did not have, which indicates which records in its database 114a need to be updated. At operation 218 the subsystem 102b on the aircraft 102 provides the data for the records denoted by the identification codes received from the subsystem 106a. At operation 220, the subsystem 106a at the facility 106 receives the data for the records in question and updates its database 114a with this information. At operation 222 both subsystems 102b and 106a store the new synchronization point in their respective databases for use with the next synchronization that is performed.

After the above operation is complete, the subsystems 102a and 102c are synchronized with the information stored in the database 110b of subsystem 102b so that subsystems 102a, 102b and 102c all have the same up to date identification codes (representing records and data) stored in their respective databases. The subsystems 106b and 106c are also (possibly simultaneously) updated with the information stored in the database 114a of subsystem 106a. When multiple sequential synchronizations are to be performed by any subsystem, such as by having subsystem 102b sequentially initiate synchronizations with subsystems 106a, 104a and 108a, then such synchronizations are performed with all the selected subsystems before the subsystems within a given aircraft or facility are synchronized amongst themselves. Thus, in this example subsystem 102b would sequentially perform synchronizations with each of subsystems 106a, 104a and 108a, and after these operations are complete, then the subsystems 102a and 102c on the aircraft 102 would be synchronized. Similar intra-group synchronizations would be performed on the subsystems at each of facility 106, facility 108 and aircraft 104.

From the foregoing it will be appreciated that the system 10 dramatically reduces the amount of data that needs to be sent between different subsystems located at different locations when synchronizing the subsystems. This is especially desirable in network environments where the bandwidth of a network connecting the various subsystems may be limited or suffer from periodic connection disruptions. The system and methodology described herein enables various subsystems to be quickly and reliably updated, even when using an asynchronous communication protocol, or even when periodic network outages are being experienced.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for synchronizing information shared by a subsystem on a mobile platform and a subsystem remote from the mobile platform, method comprising:
designating one of the subsystems as a first subsystem having a first database;
designating one of the subsystems as a second subsystem having a second database;
using the first subsystem to transmit a synchronization request to said second subsystem, said synchronization request including a synchronization point to be used as a reference for future synchronization operations between said subsystems;
using said second subsystem to receive said synchronization request and to check said second database for any records that have been created, modified, or missing since a previously performed synchronization operation;
using said first subsystem to create creating a message payload list that includes a new synchronization point, and a list of records stored in said first database that each have an associated identification number, and further that have been created since a previously performed synchronization operation;
transmitting said message payload list to said second subsystem;
using said second subsystem to compare said list of records in said message payload list to records stored in said second database since said previously performed synchronization point, to identify any one of said records in said message payload list that do not have a corresponding record stored in said second database;
sending a subsequent communication to said first subsystem to request data associated with any one of said records in said message payload request that does not include a corresponding record in said second database;
using said second subsystem to identify a new record in said second database that was created subsequent to said previously performed synchronization point, and that does not have a corresponding record listed on said message payload list; and forwarding data concerning said new record to said first subsystem.

2. The method of claim 1, further comprising using a plurality of first subsystems each having an associated first database to form a first peer domain, and performing a synchronization operation by which each one of said first databases is updated with all other ones of said first data sources before using one of said first subsystems to transmit said synchronization request to said second subsystem.

3. The method of claim 1, further comprising using a plurality of second subsystems each having an associated second database, to form a second peer domain, and performing a synchronization operation by which each one of said second databases is updated with all other ones of said second databases before any one of said second database is allowed to respond to said synchronization request from said first subsystem.

4. The method of claim 1, further comprising generating a new synchronization point for each message payload list that is generated.

5. The method of claim 1, further comprising using said second subsystem to generate a subsequent message payload list having a new synchronization point, at a point in time subsequent to said second subsystem receiving said message payload list from said first subsystem.

6. The method of claim 1, wherein communications between said first and second subsystems are performed asynchronously.

7. The method of claim 1, wherein communications between said first and second subsystems are performed synchronously.

8. A method for synchronizing information shared by a subsystem within a mobile platform and a subsystem remote from the mobile platform, the method comprising:
designating one of the subsystems as a first system having a first database;
designating one of the subsystems as a second system having a second database;
using the first subsystem to generate and transmit a message payload list that includes a synchronization point and a list of records stored in said first database, with each one of said records including a unique identification code;
using said second subsystem to receive said message payload list and to update said second database using said records;
using said second subsystem to notify said first subsystem of all records stored in said database that have been created since a previously defined synchronization point between said first and second subsystems; and
using said second subsystem to send a communication to said first subsystem to request data associated with any one of said records in said message payload request that does not include a corresponding record in said second database;
using said second subsystem to identify a new record in said second database that was created subsequent to said previously defined synchronization point, and that does not have a corresponding record listed on said message payload list; and
forwarding data concerning said new record to said first subsystem.

9. The method of claim 8, wherein using said second subsystem to update said second database comprises using said second subsystem to compare said identification code of said record included in said message payload list with identification codes of records stored in said second database.

10. The method of claim 8, further comprising:
using a plurality of said first subsystems each having a database associated therewith and identifying said first subsystems as a domain of peer data sources; and
performing a synchronization operation to synchronize data stored in all of said first databases before performing a synchronization between any one of said first subsystems and said second subsystem.

11. The method of claim 8, further comprising:
using a plurality of said second subsystems each having a database associated therewith and identifying said second subsystems as a domain of peer data sources; and
performing a synchronization operation to synchronize data stored in all of said second databases before performing a synchronization between any one of said second subsystems and said first subsystem.

12. The method of claim 8, further comprising using said second subsystem to generate a subsequent message payload list having a new synchronization point, at a time subsequent to responding to said message payload request, and transmitting said subsequent message payload list to said first subsystem.

13. The method of claim 8, wherein communications between said subsystems are performed in accordance with at least one of asynchronous and synchronous communications protocols.

14. A network system for synchronizing information shared between a mobile platform and a facility remote from the mobile platform, the system comprising:
- a first subsystem, located on-board the mobile platform and having a first database;
- a second subsystem located at the facility remote from the mobile platform, the second subsystem including a server and having a second database, the server connected to a network;
- the first subsystem configured to generate and transmit a synchronization request to said second subsystem, said synchronization request including a synchronization point to be used as a reference for future synchronization operations between said subsystems, and a message payload list that includes said synchronization point and a list of records stored in said first database that each have an associated identification number, and further that have been created since a previously performed synchronization operation;
- said second subsystem configured to;
  - receive said synchronization request and to check said second database for any records that have been created or modified since said previously performed synchronization operation, and to transmit information back to said first subsystem that includes information concerning said new or modified records;
  - to send a communication to said first subsystem to request data associated with any one of said records in said message payload request that does not include a corresponding record in said second database;
  - to identify a new record in said second database that was created subsequent to said previously performed synchronization point, and that does not have a corresponding record listed on said message payload list; and forward data concerning said new record to said first subsystem.

* * * * *